Figure 1:
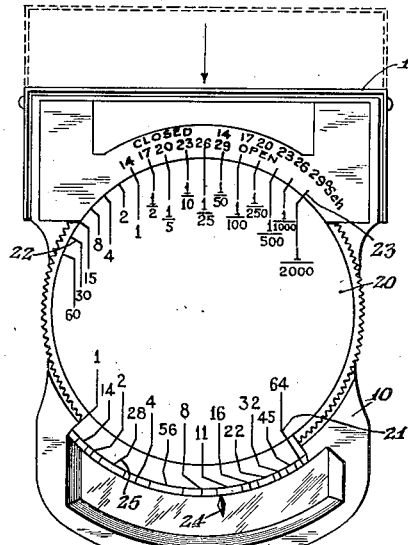

Oct. 31, 1939. J. M. BING 2,178,197

PHOTOELECTRIC EXPOSURE METER

Filed Oct. 27, 1938 2 Sheets-Sheet 1

Fig. 1-a

INVENTOR.
Joseph M. Bing
BY
ATTORNEY.

Oct. 31, 1939.  J. M. BING  2,178,197
PHOTOELECTRIC EXPOSURE METER
Filed Oct. 27, 1938  2 Sheets-Sheet 2
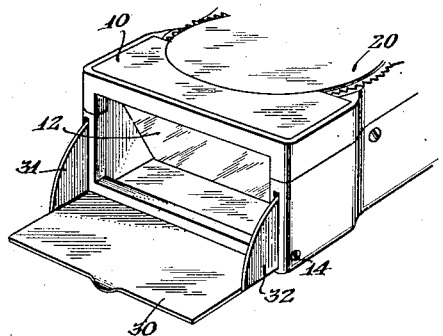
Fig: 6
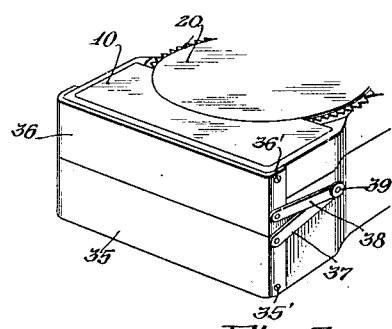
Fig: 7
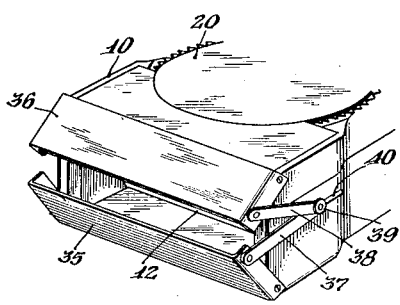
Fig: 8
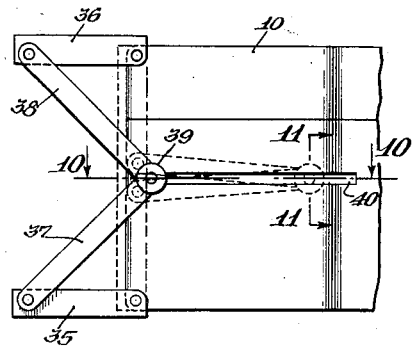
Fig: 9
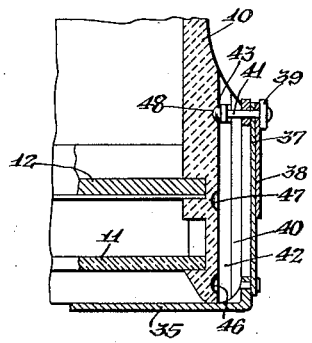
Fig: 10
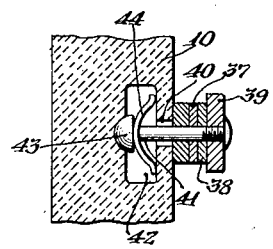
Fig: 11
INVENTOR.
Joseph M. Bing
BY
ATTORNEY.

Patented Oct. 31, 1939

2,178,197

UNITED STATES PATENT OFFICE 2,178,197

PHOTOELECTRIC EXPOSURE METER

Joseph M. Bing, New York, N. Y.

Application October 27, 1938, Serial No. 237,176

8 Claims. (Cl. 88—23)

The present invention relates to exposure meters for use as accessories for photographic cameras to determine the proper diaphragm opening and shutter speed for securing a correctly exposed picture under any given conditions of illumination or brightness of the object or scene to be photographed.

The invention is more particularly concerned with exposure meters of the type comprising a photoelectric cell comprising a more or less flat light sensitive element adapted to generate an electric current by the light striking the same and an electric measuring instrument for indicating the current generated which for all practical purposes is proportional to the degree of brightness or intensity of the light falling on the cell surface.

One of the problems encountered in the design and construction of exposure meters of the above type is the provision of means for limiting the so-called view or acceptance angle of the meter to correspond to the field of view of the photographic objective of a camera in connection with which the meter is to be used in order to prevent the inclusion in the measurement of light rays originating from objects outside the scene or field of view of the camera, or in other words to make sure that the light which is allowed to fall on the cell is confined to that which should determine the camera exposure. Cameras for average use have a field angle of about 50° and accordingly the acceptance angle of the exposure meter for normal use should correspond approximately to this value, whereby the meter will measure the light originating from the same scene or object as will be reproduced upon the sensitive plate or film in the camera provided it is pointed in the proper position during the measurement so as to encompass the same objected field as the camera objective.

Accordingly, an object of the invention is to provide a photoelectric exposure meter with means for limiting the effective view or acceptance angle of the meter to correspond to the field angle of a photographic camera.

Another object is the provision of means normally serving as a protective cover for the light sensitive element in the non-operative condition of the meter and adapted to serve as a light screen or limiting means to prevent the effects of light rays falling outside the desired field of view in the operative or measuring condition of the meter.

In the construction of photoelectric exposure meters especially meters for use over a wide range of illumination or scene brightness such as between dark interior and bright outdoor scenes it has become customary to sub-divide the measuring range or response sensitivity of the meter into at least two ranges such as by the provision of a series resistance which may be connected and disconected in the circuit of the photoelectric cell or alternatively by the aid of a screen or equivalent light modifying element limiting the amount of light striking the photoelectric cell to a fraction of the light when no screen or modifying element is employed.

Accordingly, a further object of the invention is to provide adjustable means to restrict the amount of light falling on the photoelectric cell to a predetermined fraction to limit the sensitivity of the meter accordingly and to extend its range to cover both poor and bright lighting conditions.

Another object is the provision of a light restricting element to be placed in front of the photoelectric cell to limit the measuring sensitivity and which also serves as a protecting cover for the photoelectric cell in the non-operative condition of the meter.

Still a further object is to provide combined means adapted to serve both as a protective cover for the photoelectric cell in the non-operative condition of the meter, as a means to restrict the light falling on the photoelectric cell to a predetermined fraction in the operative condition of the meter and furthermore to limit the effective view or acceptance angle of the meter to a desired value corresponding to the field of view of a photographic camera.

Figure 2:
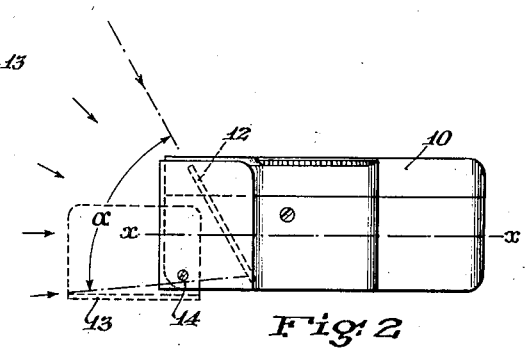
Figure 3:
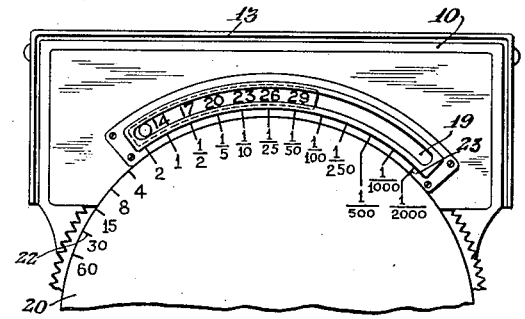
Figure 3:
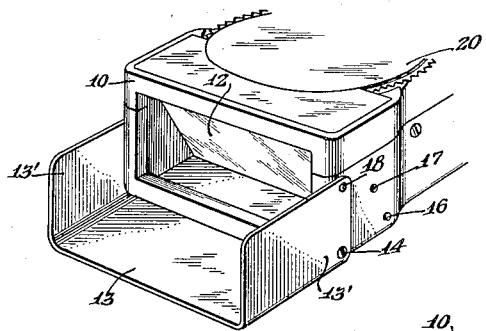
Figure 4:
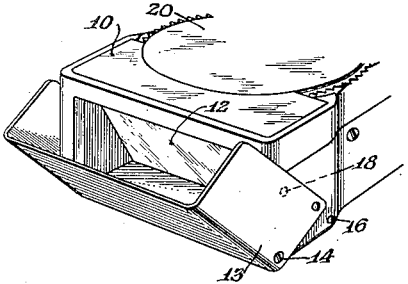
Figure 5:
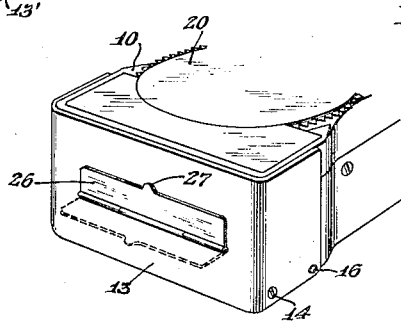

The above and further objects and advantages of the invention will become more apparent from the following detailed description taken with reference to the accompanying drawings forming part of this specification and wherein:

Figure 1 is a top view on an enlarged scale of a photoelectric exposure meter constructed in accordance with the invention, Figure 1a is an enlarged partial view of Figure 1 illustrating a modification thereof, Figure 2 is a side view in natural size of the meter shown in Figure 1, Figure 3 is a partial isometric view of the meter in one operative position having a specified sensitivity, Figure 4 is a view similar to Figure 3 showing the meter in another operative position for a different sensitivity, Figure 5 shows a further modification for obtaining different meter sensitivities, Figure 6 is a structural modification of Figure 3, Figures 7 and 8 are fractional isometric views of a further modification of the invention for varying the meter sensitivity in the non-operative and low sensitivity conditions, respectively, Figure 9 is an enlarged partial side view of the meter according to Figures 7 and 8 in the operative condition for high sensitivity, Figure 10 is a partial sectional view taken on line 10—10 of Figure 9, Figure 11 is a further partial sectional view taken on line 11—11 of Figure 9.

Like reference numerals identify like parts throughout the different views of the drawings.

Referring more particularly to Figure 1, there is shown an exposure meter comprising a casing 10 consisting preferably of a molded artificial resin such as a condensation product of phenol and formaldehyde or any other fixable or thermoplastic moldable material. The casing in the example shown has an upper straight end with an opening or recess therein and a lower round end adapted to fit the palm of the hand when holding the meter so as to point in the direction of the object or scene to be photographed. Spaced by a certain distance from the open or front end of the casing 10, there is mounted an oblong photoelectric cell 12 preferably of the self-generating or photo-voltaic type and comprising in a known manner a base electrode or metal plate having applied thereto a coating of light sensitive material such as selenium or cuprous oxide, said coating being in turn covered by a thin translucent metallic layer or light receiving electrode. If light falls through the receiving electrode on the light sensitive coating, an electric potential difference is generated between the metal plate and metallic layer being substantially proportional to the intensity of the light rays falling on the cell surface. There is further provided an electrical current measuring instrument mounted within the casing in any suitable manner (not shown for the sake of simplicity of illustration). This measuring instrument is connected between the base electrode and metallic layer of of the photoelectric cell through electrical conductors, whereby the deflection of the pointer or needle of the instrument indicates the degree of illumination or intensity of the light reflected from the scene or object towards which the meter is pointed. The meter reading may be translated into suitable exposure data such as exposure times with regard to film or emulsion speeds, shutter speeds and diaphragm apertures through scales or a mechanical calculating or converting device such as shown in the drawings and described hereafter.

In order to limit the effective view or acceptance angle of the meter to correspond with the field of view of the photographic objective in a camera in connection with which the meter is to be used, the photoelectric cell 12 is sufficiently spaced from the open wall of the casing and is furthermore mounted in a tilted or inclined position so as to face downwards in a direction towards the rear end of the casing in such a manner as to restrict the elevational angular spread of light rays falling on the cell surface and preventing excessive sensitivity to skylight. Moreover, the effect of reflections from the near foreground or horizon are removed by the provision of a combined shield and cover having a main portion 13 and a pair of lateral upturned walls 13', the latter being hinged to the casing such as by means of pivot screws 14. In the closed or non-operative condition of the meter as shown in full lines in Figure 2, the cover serves as a protection for the photoelectric cell, while in the open position shown in dotted lines in Figure 2 and in perspective view in Figure 3 the cover serves as a shield for the light rays reflected from the near foreground in such a manner as to limit the directional characteristic or average effective angular spread of light rays falling on the cell surface in a vertical plane in conjunction with the tilted position of the photoelectric cell to a desired angle α as indicated by the arrows in Figure 2 of the drawings. In practice, the inclination of the cell to the horizontal axis $x$—$x$ in the operative or measuring position of the meter and the effect of the cover or screen are such that those light rays falling on the receiving electrode or cell surface which have the greatest inclination only enclose an angle of a certain magnitude which is approximately equal to the image received by the camera or is somewhat smaller than the latter. In the example shown the angle α is somewhat greater than 50° or the average field angle of photographic cameras; however, the average effective acceptance angle will only be about 50° due to the very small photoelectric effect of light rays striking the cell at small angles in accordance with the well known sine law relationship. As is understood any other acceptance angle may be obtained by the proper design and relative arrangement of the elements to suit any special requirements such as for motion picture cameras having a substantially smaller field of view or camera angle.

As pointed out, the above described construction has the effect that only such light will react upon the cell surface as passes from the object or scene to be photographed through the objective of the camera to the film or plate, or at least, that light coming from a greater angle than that of the camera image does not reach the receiving electrode of the photoelectric cell provided the meter is pointed in the proper direction so that its view or acceptance angle coincides with the field of view of the camera. In practice, this is the case if the meter is pointed with its axis $x$—$x$ towards the center of the object field or scene to be photographed.

While the arrangement described primarily affords a limitation of light rays in a vertical plane being of major importance in practical photography by cutting out undesirable skylight and reflections from the near foreground, a directional characteristic or limited angular spread of light rays affecting the photoelectric cell with regard to a horizontal plane is obtained by the construction described to a practically sufficient degree due to the effect of the lateral walls 13' of the cover or screen 13 as is understood.

The open and closed position of the cover may be fixed in any suitable manner such as by the provision of an extension or protuberance on the inner side of at least one of the side walls 13' adapted to engage depressions 16 and 18 in the outer wall of the casing 10 due to the natural resiliency of the cover.

According to a modification, the cover 13 may serve as a means to provide different measuring ranges or degrees of sensitivity of the meter for use under both poor and strong lighting conditions or to extend the operating range of the meter from dark interior scenes to outdoor scenes in bright sunshine. This object is obtained in a most simple manner with a meter of the type described by defining an intermediate position of the cover 13 by the provision of a further depression 17 intermediate the depressions 16 and 18 in the side wall of the casing 10. In Figure 4 the cover 13 is shown in this intermediate position, whereby the total amount of light falling on the cell surface is reduced to a predetermined fraction compared with the fully open position of the cover shown in Figure 3. At the same time, the acceptance angle of the meter is somewhat decreased which however, is not a disadvantage due to the fact that the meter is usually pointed towards the object of greatest pictorial interest such as a person, etc., whereby due to the limited view angle substantially only the light reflected from such object will be measured and the exposure determined with regard to the object of major pictorial interest while the remainder of the scene will be renderd sufficiently by reason of the wide margin of exposure latitude of present day photographic materials. In the same ratio the measuring sensitivity of the meter will be decreased. The different measuring ranges may be taken care of by providing differently colored scales in a known manner or by means of an adjustable converter or calculator such as will be described hereafter.

Referring to Figure 5, there is shown an alternative construction for securing different measuring ranges or meter sensitivities. According to this embodiment, the cover 13 is provided with a cut-out or rectangular opening admitting only a fraction of the amount of light compared with the light reaching the photoelectric cell in the open position of the cover (Figure 3). This further opening is provided with a hinged door or cover 26 having a lip 27 to assure a ready grasp in opening and closing the same.

In Figure 6, there is shown a modified construction of a hinged cover and light shield having a main portion 30 and sector shaped lateral portions 31 and 32 adapted to move within slits in the meter casing or alternatively adjacent to the inner walls of the casing.

Referring to Figures 7 to 11, there is shown a further modification of a meter construction with a combined cover and light shield serving also as a modifier to secure different measuring ranges in a manner similar as described hereinbefore. According to this embodiment the cover consists of two parts 35 and 36 hinged at the upper and lower edges of the casing as shown at 35' and 36', respectively, so as to swing away from and towards each other as is readily understood from the drawings. The inner ends of the lateral walls of the cover portions 35 and 36 are hinged to a pair of links 37 and 38, respectively, the opposite ends of which are pivotally connected to an adjusting member or knob 39 having secured thereto a shaft or pin 41 adapted to slide within a slot 40 in the side wall of the casing 10.

According to the specific construction illustrated there is furthermore provided within the casing wall a channel 42 receiving the inner end of the shaft 41, the latter being provided with a round head 43 pressed against the inner wall of the channel 42 by means of an arcuate spring 44 having a central perforated section passed through the shaft 41 and engaging the head 43 on the one hand and having its outer ends slidably engaging the opposite wall of the channel 42 on the other hand. The inner wall of the channel 42 is provided with depressions 46, 47, 48 engaged by the head 43 of shaft 41 due to the action of the spring 44 and spaced from each other by predetermined distances to define three positions of the knob 39 corresponding, respectively, to a completely closed position of the members 35 and 36 in the non-operative condition of the meter, Figure 7 to semi-closed position corresponding to low meter sensitivity, Figure 8, and to fully open position corresponding to high meter sensitivity similar to the positions defined by the depressions 16, 17, 18 in Figures 3 and 4.

In the embodiment according to Figures 7 to 11, the upper cover portion 36 in the open or semi-open position acts additionally as a shield preventing the effect of the most undesirable skylight and limiting the vertical acceptance angle, thereby making it possible to mount the photoelectric cell at a closer distance from the end of the casing and resulting in a smaller size and more compact construction of the meter. The lower cover member 35 acts as a light shield in the same manner as in the previously described embodiments in removing the effects of undesirable reflections from the near background, other details being substantially similar to those described hereinbefore.

As pointed out previously, the reading or deflection of the needle or pointer 24 of the current measuring instrument in Figure 1 visible through an opening in the top wall of the casing when pointing the meter in a direction towards the object or scene to be photographed is a measure of the light value or scene brightness and may serve as a direct indication of the diaphragm opening or shutter speed other factors like the film or plate sensitivity being constant. Alternatively, the meter reading may be utilized in conjunction with a separate calculator or converter for translating a read scene brightness into the proper exposure data to obtain a correct exposure under the given lighting conditions.

A converter scale of this type is shown in Figure 1 and comprises a rotatable disk 20 mounted on the top of the casing 10 and having a knurled edge protruding slightly beyond the recessed intermediate portions of the casing to ensure a ready grip by the thumb when holding the meter in the palm of the hand and pointing it towards a photographic scene in the operating or measuring condition. The disk 20 which may be mounted in any suitable manner carries a pair of adjacent scales arranged at its outer periphery, viz. a lower scale 21 calibrated in diaphragm openings or "stop" values ranging in the example shown from a "stop" f/1 to a "stop" f/64. The other scale upon the disk 20 having calibrations equally spaced to the calibrations of the scale 21 in the example shown reads in shutter speeds ranging from 1/2000 of a second to 60 seconds. The shutter speed scale 22 cooperates with a film speed or sensitivity scale 23 opposite to it and arranged fixedly upon the top of the casing 10. The film speed scale in the example illustrated comprises the values from 14 to 29 degrees according to the well known "Scheiner" speed system. The upper or "stop" scale 21 cooperates with the pointer 24 of the current measuring instrument through guide lines or connecting channels 25 serving to correlate the non-linear movement of the needle 24 for equal changes in illumination or scene brightness with the linear scales on the meter.

In use, a desired shutter speed on the scale 23, say 1/50 of a second used in the majority of cases to prevent the effects of camera movement or jarring at the moment of exposure, is set opposite to the speed of the film used in the camera by rotating the disk 20 to the desired position. The required diaphragm opening is then directly read by following the position of the pointer 23 along the adjacent guide line or channel 25 to the corresponding stop number on the scale 24.

In order to take consideration of the different measuring ranges or sensitivities of the meter in the open or semi-open position of the shield or cover as described hereinabove, there are provided in Figure 2 two similar film speed scales displaced relative to each other by a distance depending on the ratio of sensitivities in the open and closed or semi-closed positions of the cover, respectively, as described by Figures 3 and 11. Alternatively, a single film speed scale may be provided upon a slidable arcuate element 19 as shown in Figure 1a set at opposite limit positions corresponding to the measuring range or sensitivity used.

It will be obvious from the above that the invention is not limited to the specific constructions and arrangement of elements shown and disclosed herein for illustration, but that the principle and underlying novel concept as described are susceptible of numerous modifications and embodiments coming within the broad scope and spirit of the invention as defined by the appended claims. The specification and drawings are accordingly intended to be regarded in an illustrative rather than in a limiting sense.

I claim:

1. In a photoelectric exposure meter, a flat casing having a front wall with a light permeable opening therein, an oblong photo-voltaic cell located within said casing behind said opening so as to be energized by light entering said opening, said cell being mounted in a slanting position in a direction away from said opening so as to prevent excessive skylight from falling upon its light sensitive surface, a measuring instrument electrically connected to said cell, said instrument being located in said casing and having a movable pointer visible through a window in the top wall of said casing, and an adjustable member adapted to serve as a protective cover for said opening in the non-operative condition of the meter and to act as a shield preventing light reflected from the rear foreground from reaching the cell surface in the operative open position when the meter is held substantially horizontally with said opening pointing toward a photographic scene, the slanting position of said cell and said adjustable member in the operative position being so related as to cooperate to secure an effective viewing field of said meter of a predetermined angular spread.

2. In a photoelectric exposure meter, a casing having a front wall with a light permeable opening therein, a substantially flat photo-voltaic cell located within said casing behind said opening so as to be energized by light entering said opening, said cell being mounted in a slanting position to prevent excessive sky-light from reaching its light-sensitive surface, a measuring instrument electrically connected to said cell, said instrument being located within said casing and having a movable pointer visible through a window in the top wall of said casing and a pivotally mounted cover screen adapted to close said opening in the non-use condition of said meter and to act as a shield preventing light rays reflected from the near foreground from reaching the sensitive surface of said cell in the operative open position when the meter is held substantially horizontally with said opening pointing toward a photographic scene, the slanting position of said cell and said cover in its open position being so related as to secure an effective viewing field of said meter having a predetermined angular spread.

3. An exposure meter as claimed in claim 2 including further means in cooperative relation with said cover for limiting the amount of light passing said opening to a predetermined fraction of the light passed in the fully open position of said cover.

4. In an electric exposure meter as claimed in claim 2, said cover having upturned lateral walls being contiguous to the outer lateral surfaces of said casing in the closed position.

5. In an exposure meter as claimed in claim 2, said cover having upturned lateral walls being contiguous to the inner lateral surface of said casing in the closed position.

6. In an electric exposure meter, a casing having a front wall with a light permeable opening therein, a photoelectric cell located within the casing behind said opening so as to be energized by light entering said opening, a measuring instrument electrically connected to said cell, said instrument being located in said casing and having a movable pointer visible through a window in the top wall of said casing, a pair of cover members having their outer ends hingedly secured to said casing so as to swing toward and away from each other and adapted to close said opening in a non-operative condition of the meter, an adjusting member arranged to slide along the side of said casing, links pivotally connecting said adjusting member with the inner ends of said cover members, whereby said cover members may be adjusted to open and close position by operation of said adjusting member.

7. In an exposure meter as claimed in claim 6, means for defining positions of said adjusting member corresponding to fully open, closed and to at least one predetermined intermediate position of said cover members.

8. In an electric exposure meter, a casing having a front wall with a light permeable opening therein, a photo-electric cell located within the casing behind said opening so as to be energized by light entering said opening, a cover hingedly secured to said casing adapted to close said opening in the non-operative position of the meter, said cover adapted to be swung in a downward direction to act as a shield preventing light reflected from the near foreground from reaching the cell surface in the operative condition of the meter when the meter is held substantially horizontally with said opening pointing toward a photographic object scene, said cover having at least one opening therein, and a further cover for said last opening hingedly secured to said first mentioned cover.

JOSEPH M. BING.